(12) United States Patent  (10) Patent No.: US 7,044,538 B2
Stack  (45) Date of Patent: May 16, 2006

(54) CENTER STACK FACE PLATE WITH INTEGRATED HVAC DUCT ASSEMBLY

(75) Inventor: John Stack, Shelby Township, MI (US)

(73) Assignee: Lear Corporation, Southfield, MI (US)

( * ) Notice: Subject to any disclaimer, the term of this patent is extended or adjusted under 35 U.S.C. 154(b) by 85 days.

(21) Appl. No.: 10/842,671

(22) Filed: May 10, 2004

(65) Prior Publication Data

US 2005/0248175 A1    Nov. 10, 2005

(51) Int. Cl.
   *B60J 7/00*    (2006.01)
(52) U.S. Cl. .......................... 296/208; 296/70
(58) Field of Classification Search ................ 296/208, 296/70; 454/69, 75
   See application file for complete search history.

(56) References Cited

U.S. PATENT DOCUMENTS

| 4,390,124 | A | 6/1983 | Nilsson |
| 5,706,170 | A | 1/1998 | Glovatsky et al. |
| 6,073,987 | A | 6/2000 | Lindberg et al. ............... 296/70 |
| 6,371,551 | B1 | 4/2002 | Hedderly ..................... 296/192 |
| 6,488,330 | B1 | 12/2002 | Hedderly ..................... 296/192 |
| 6,517,145 | B1 | 2/2003 | Hedderly ..................... 296/192 |
| 2003/0232591 | A1* | 12/2003 | Nanaumi et al. ........... 454/156 |

* cited by examiner

*Primary Examiner*—Joseph D. Pape
(74) *Attorney, Agent, or Firm*—Bill Panagos

(57) ABSTRACT

This invention relates to a center stack face plate that has an integrated HVAC duct assembly. This invention removes many parts and assemblies from typical HVAC duct assemblies and provides complete integration of HVAC duct assembly within the center stack face plate. The connector duct and air conditioner housing along with the barrel assembly make a direct point of connection with the center stack face plate allowing for typical usage of an HVAC system in a more streamlined fashion.

8 Claims, 12 Drawing Sheets

CENTER STACK FACE PLATE WITH INTEGRATED HVAC DUCT ASSEMBLY

FIELD OF THE INVENTION

This invention relates to a center stack face plate in automobiles. More specifically, it relates to a center stack face plate that has an integrated HVAC duct assembly.

BACKGROUND OF THE INVENTION

With standard heating, ventilation, and air conditioning ("HVAC") systems in automobiles, the HVAC connector duct, air conditioning barrel, and housing assembly all fit into the center stack face plate by way of separate assemblies and separate assembly processes. In a standard center stack face plate, there is typically a box for the HVAC system with controls and a box for the radio. Above the boxes are grills that release the hot or cold air depending on user needs. All of these parts are connected to the center stack face plate by separate assemblies that result in increased parts, increased assembly time, and increased manpower to assemble.

Emerging technology always has the goal of attempting to reduce the number of assemblies and parts in this industry. However, the standard HVAC system has not been able to streamline the assembly as this invention has. This invention reduces the number of pieces necessary in a standard HVAC system, reduces the assembly time, and reduces the required manpower needed to assemble the system. It eliminates blind load and reduces possible location errors because the number of overall assemblies is reduced.

SUMMARY OF THE INVENTION

A center stack face plate in a motor vehicle comprising an integrated HVAC system further comprising a connector duct and conditioner housing and an integrated barrel assembly. The center stack face plate makes a direct connection with the HVAC connector duct and air conditioner housing and the integrated barrel assembly. The center stack face plate, at the point of this connection, eliminates any need for additional seals, joints, or ducts. The connection is made in the back plate of the center stack face plate.

This invention will innovate the center stack area by merging pieces and eliminating excess parts that are generally part of standard systems. This will result in only one joint and any additional seals will be eliminated. As a result, the HVAC system will be fully merged into the structural part of the center stack face plate resulting in full integration of the parts.

DETAILED DESCRIPTION OF THE DRAWINGS

DETAILED DESCRIPTION OF THE PREFERRED EMBODIMENT

Figure 1:
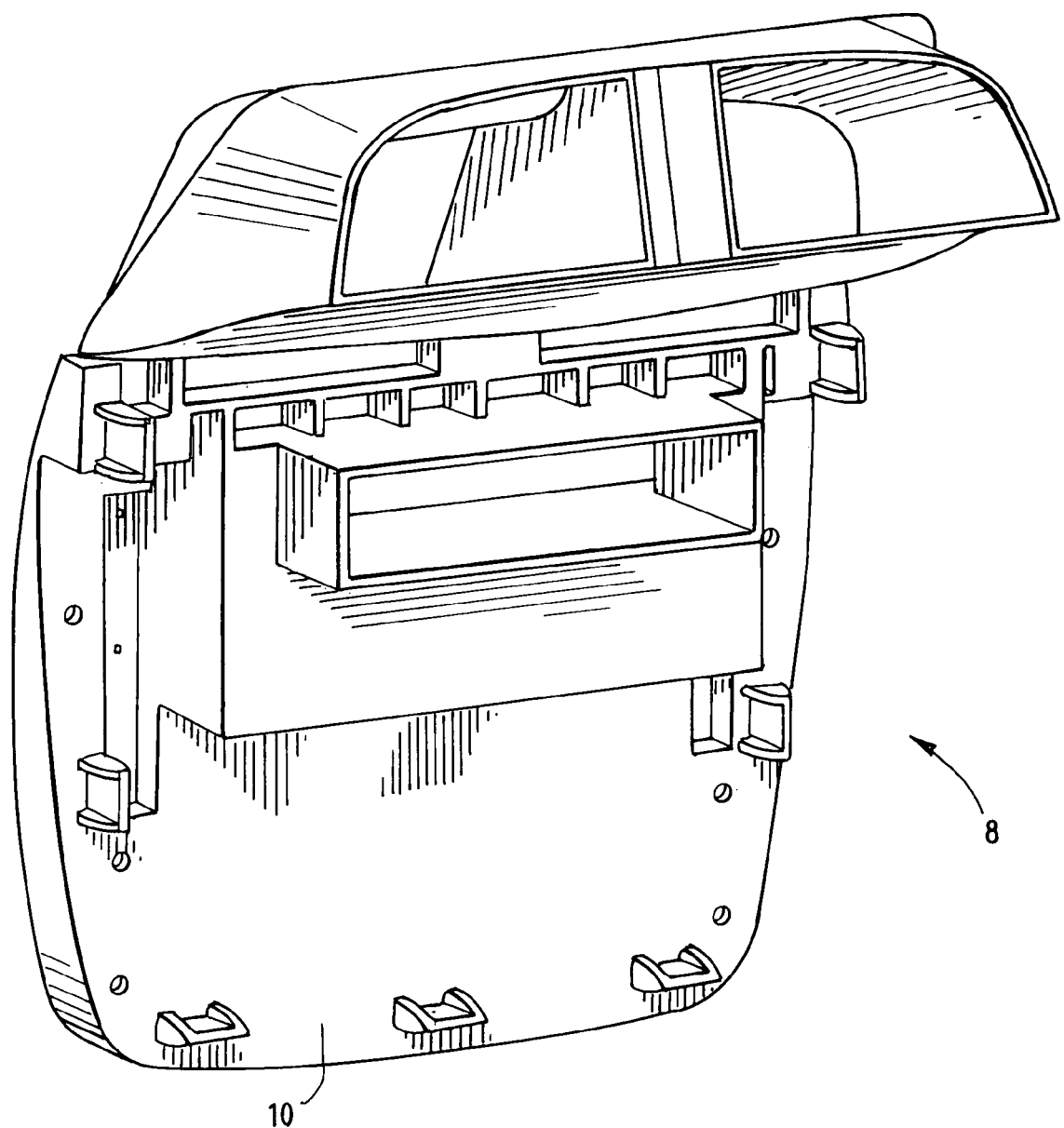
FIG. 1 is a view of the back plate of the center stack face plate without the grills, ducts, or radio attachments added.
Figure 2:
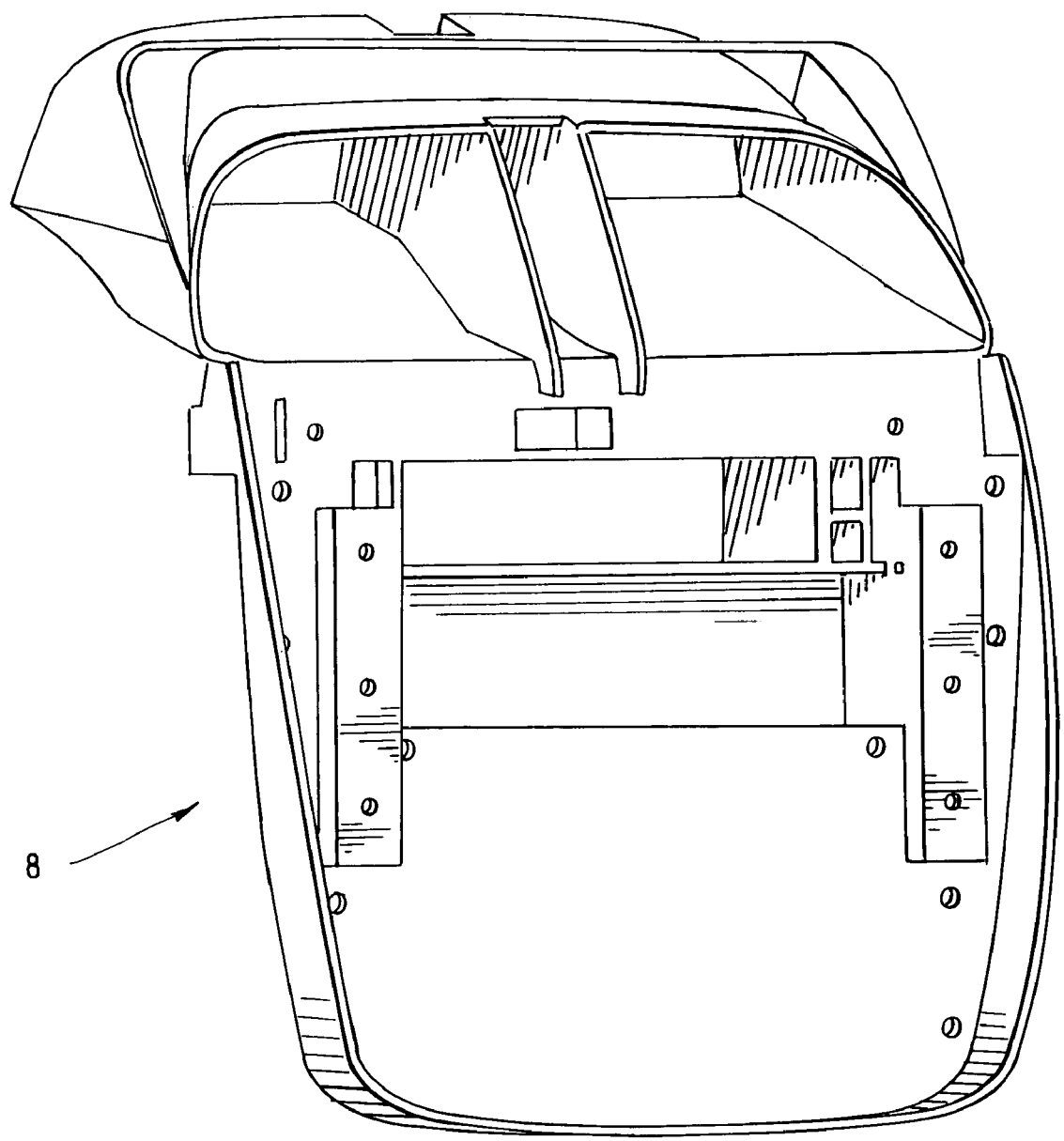
FIG. 2 is a view of the center stack face plate without any attachments, controls, or grills added.
Figure 3:
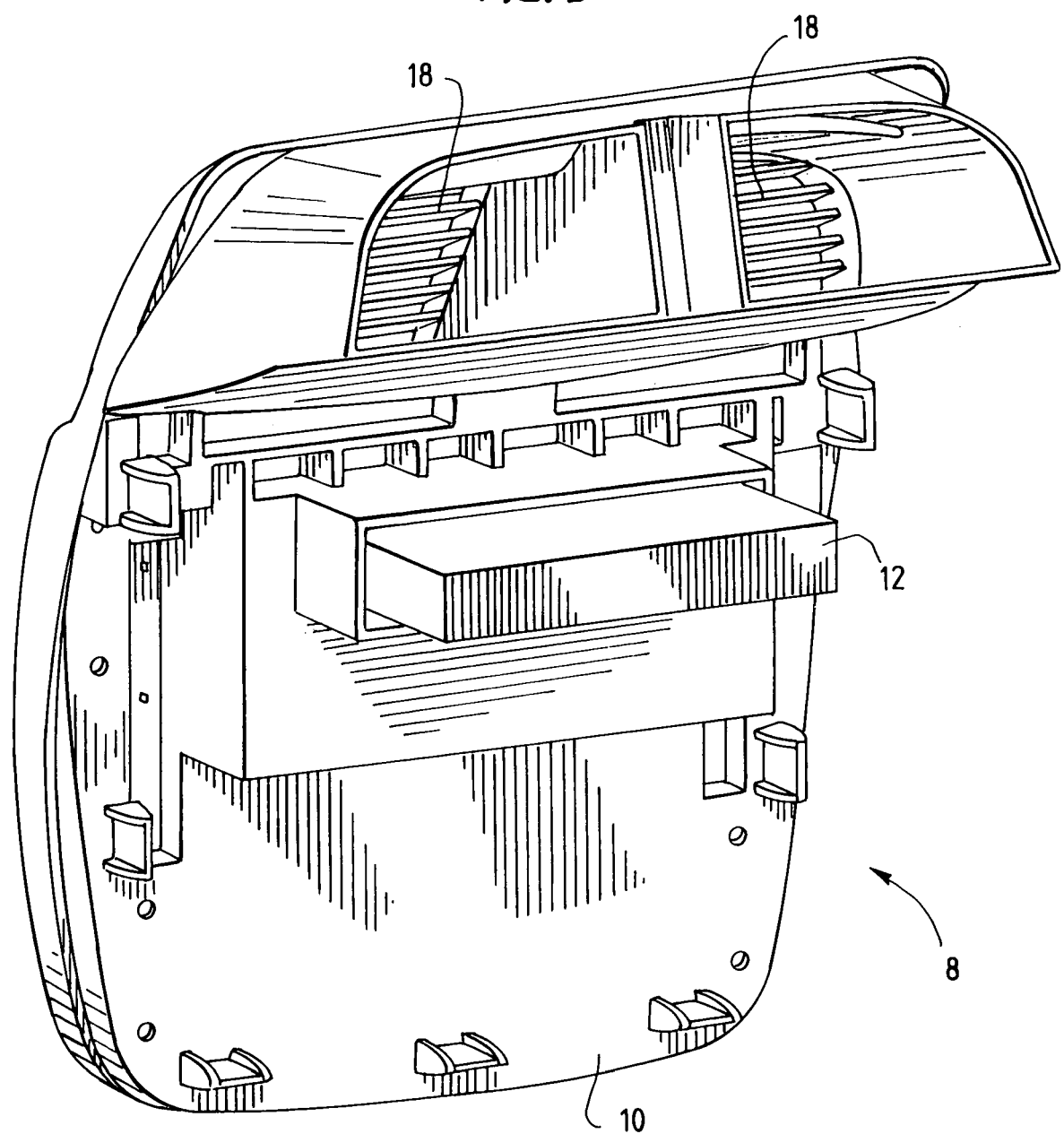
FIG. 3 is a view of the back plate of the center stack face plate with the grills and CD changer in place.
Figure 4:
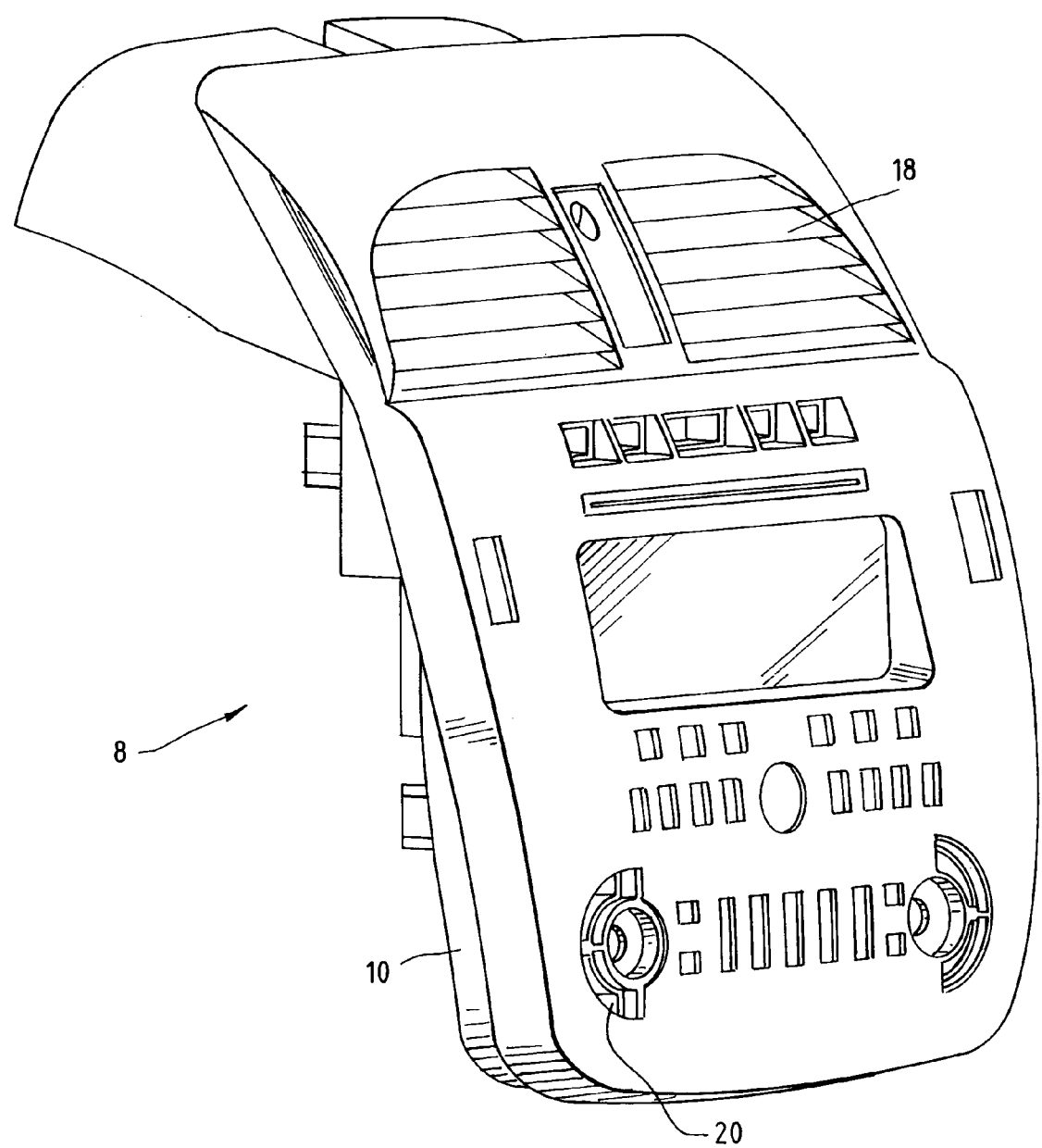
FIG. 4 is a view of the center stack face plate depicting the grills and openings radio and heater/air conditioning controls.
Figure 5:
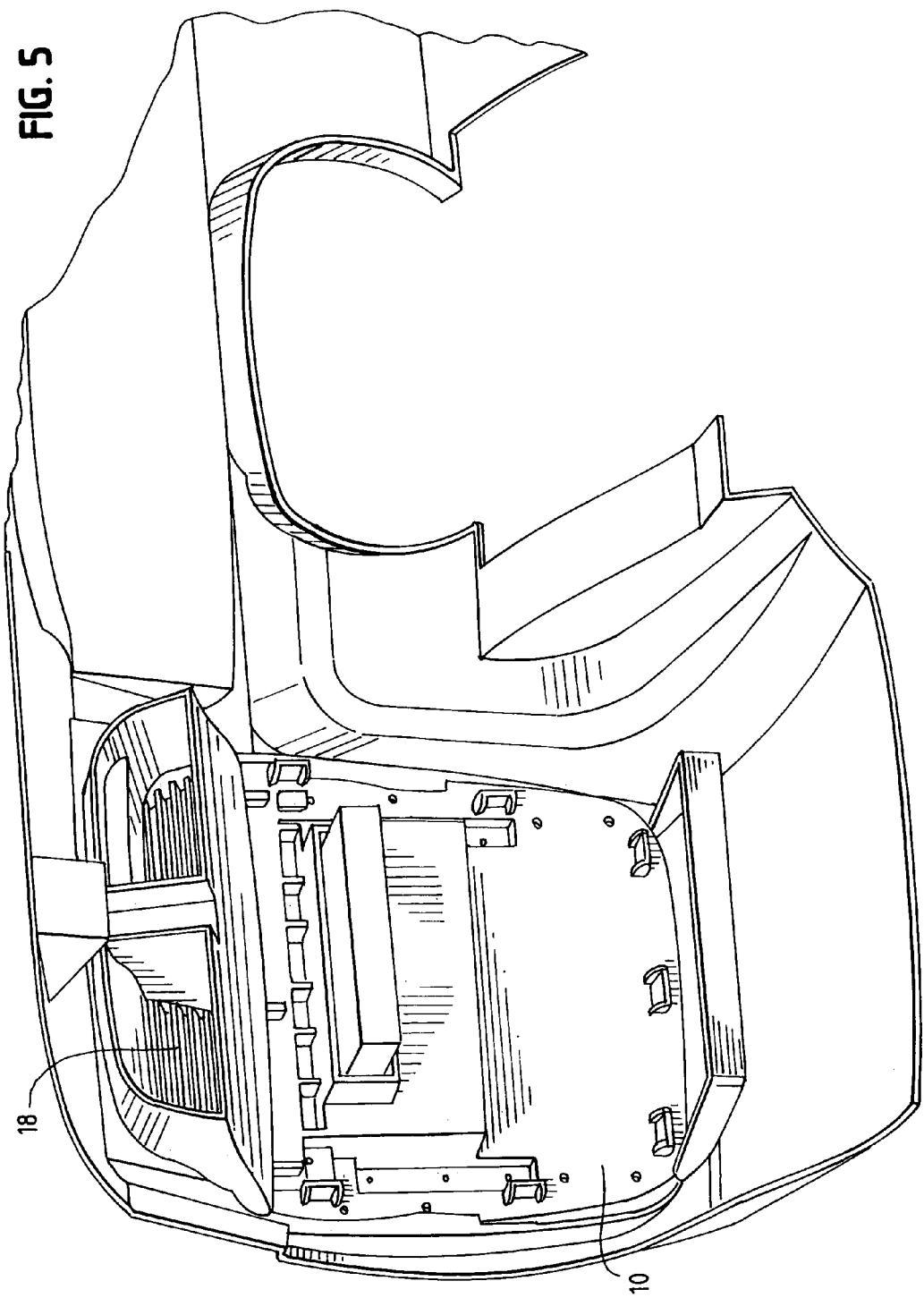
FIG. 5 is a view of the back plate center stack face plate as it would be seen installed in the dashboard of a motor vehicle.

This invention relates to a center stack face plate 8 in a motor vehicle comprising an integrated HVAC system further comprising a connector duct and air conditioner housing 14 and an integrated barrel assembly 16. FIGS. 1–2 depict a stripped down center stack face plate 8 as seen from the view of the back plate 10. FIG. 3 depicts the same back plate 10 but with the grills 18 and CD changer 12 added. In motor vehicles, hot or cold air will be released through the grills 18 of the center stack face plate 8 to either heat or cool the interior of the motor vehicle to the temperature desired by the user.

Figure 6:
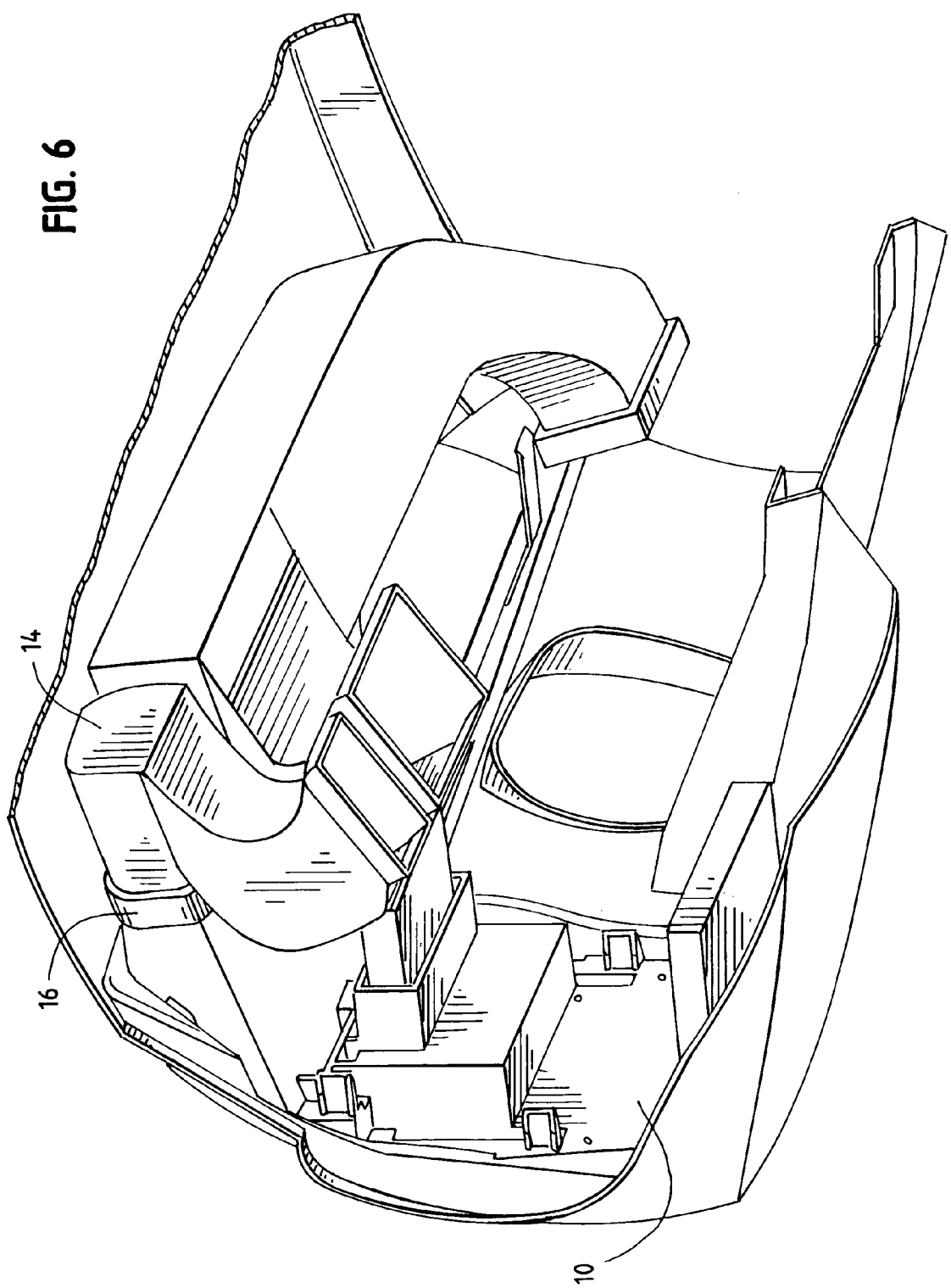
FIG. 6 is a view of the integrated HVAC system making its direct connection with the center stack face plate on the back plate.
Figure 7:
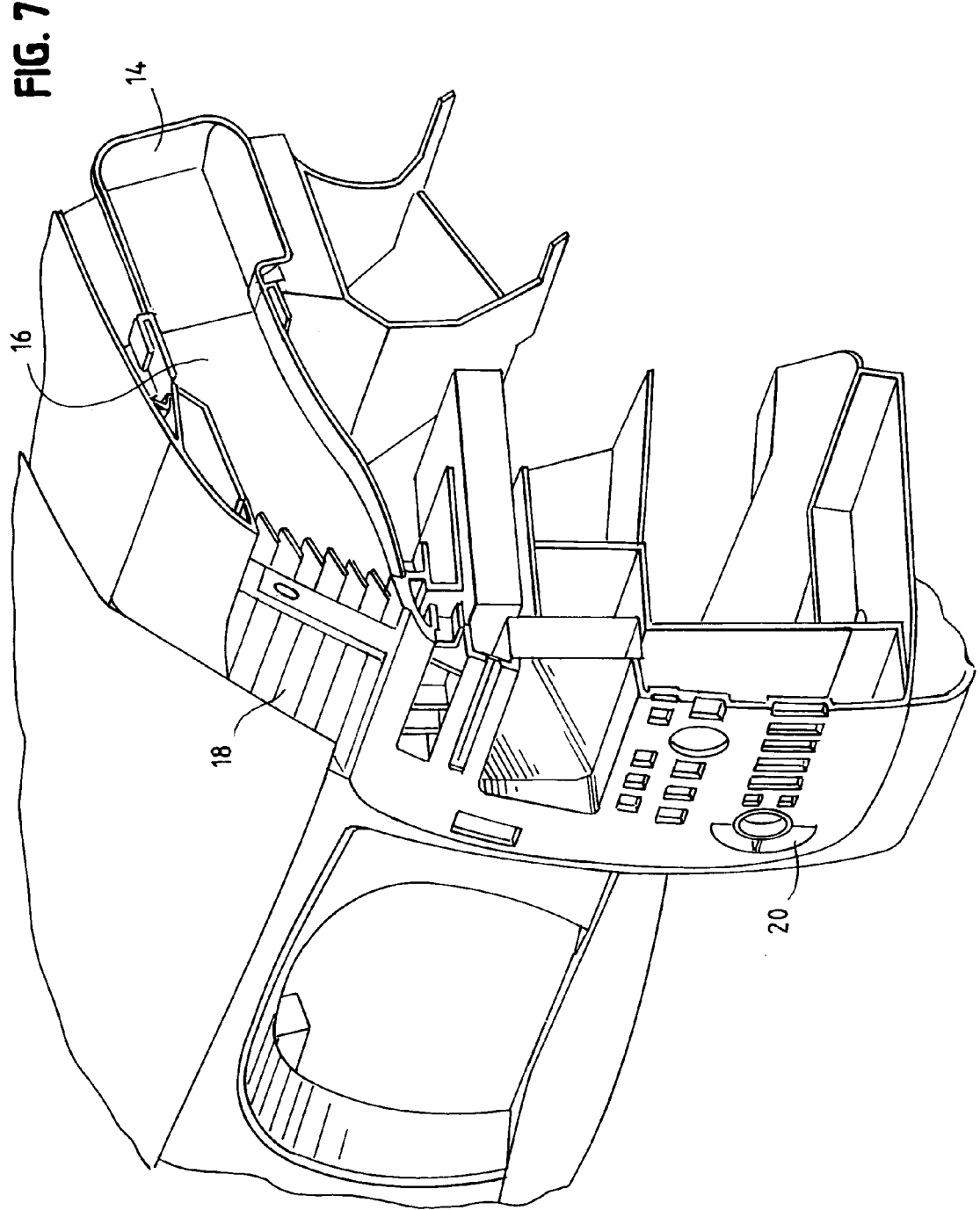
FIG. 7 is a cross-sectional view of the center stack face plate further depicting the direct connection between the integrated HVAC system and the center stack face plate.
Figure 8:
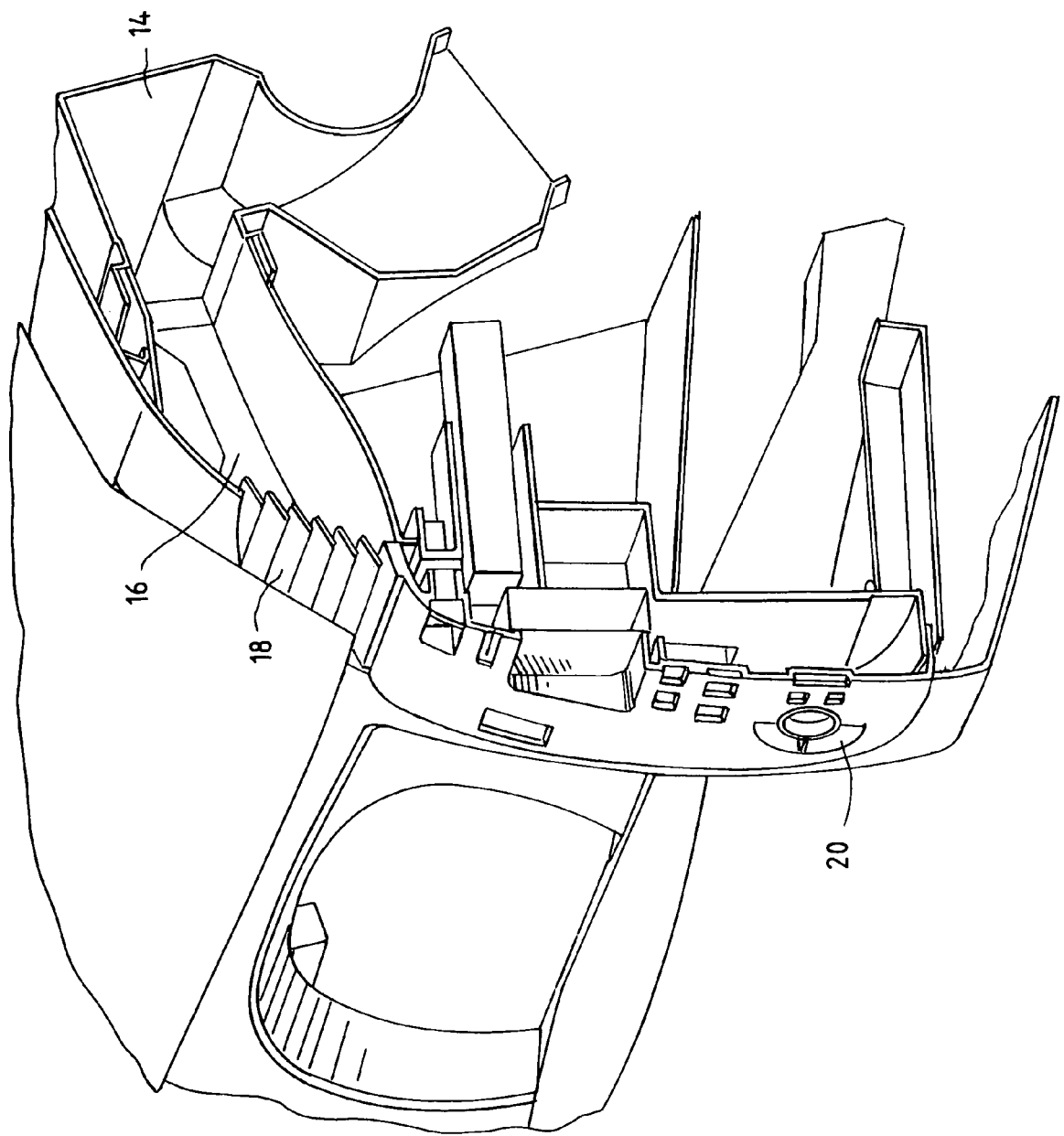
FIG. 8 is a cross-sectional view of the center stack face plate further depicting the direct connection between the integrated HVAC system and the center stack face plate and showing more detail in the ducts.
Figure 9:
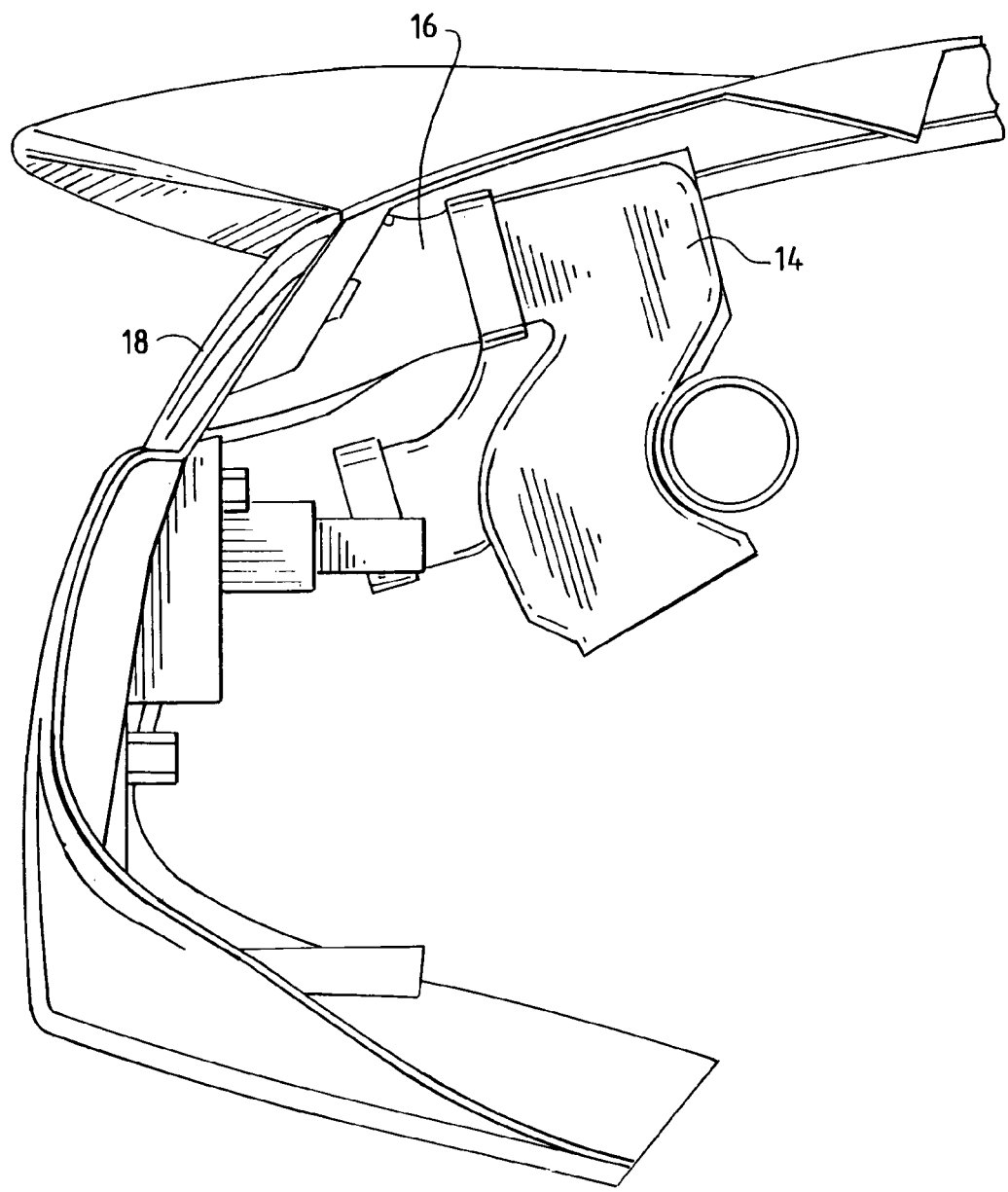
FIG. 9 is a side view of the integrated HVAC system depicting the connector duct and air conditioner housing and barrel assembly.

FIG. 6 depicts the integrated HVAC system with its barrel assembly 16 and connector duct and air conditioner housing 14 making a direct connection with the back plate 10 of the center stack face plate 8 at the opening of the grills 18. FIGS. 7–9 further depict this invention and its streamlined features with a reduced number of parts and assemblies. The connector duct and air conditioner housing 14 and the barrel assembly 16 requires no additional seals or joints to make this direct connection. At this point, the connector duct and air condition housing 14 and barrel assembly 16 become fully merged and integrated with the center stack face plate 8. This direct point of connection reduces the need for further parts and/or assembly and cuts done on assembly time and errors that occur when standard HVAC systems are installed.

Figure 10:
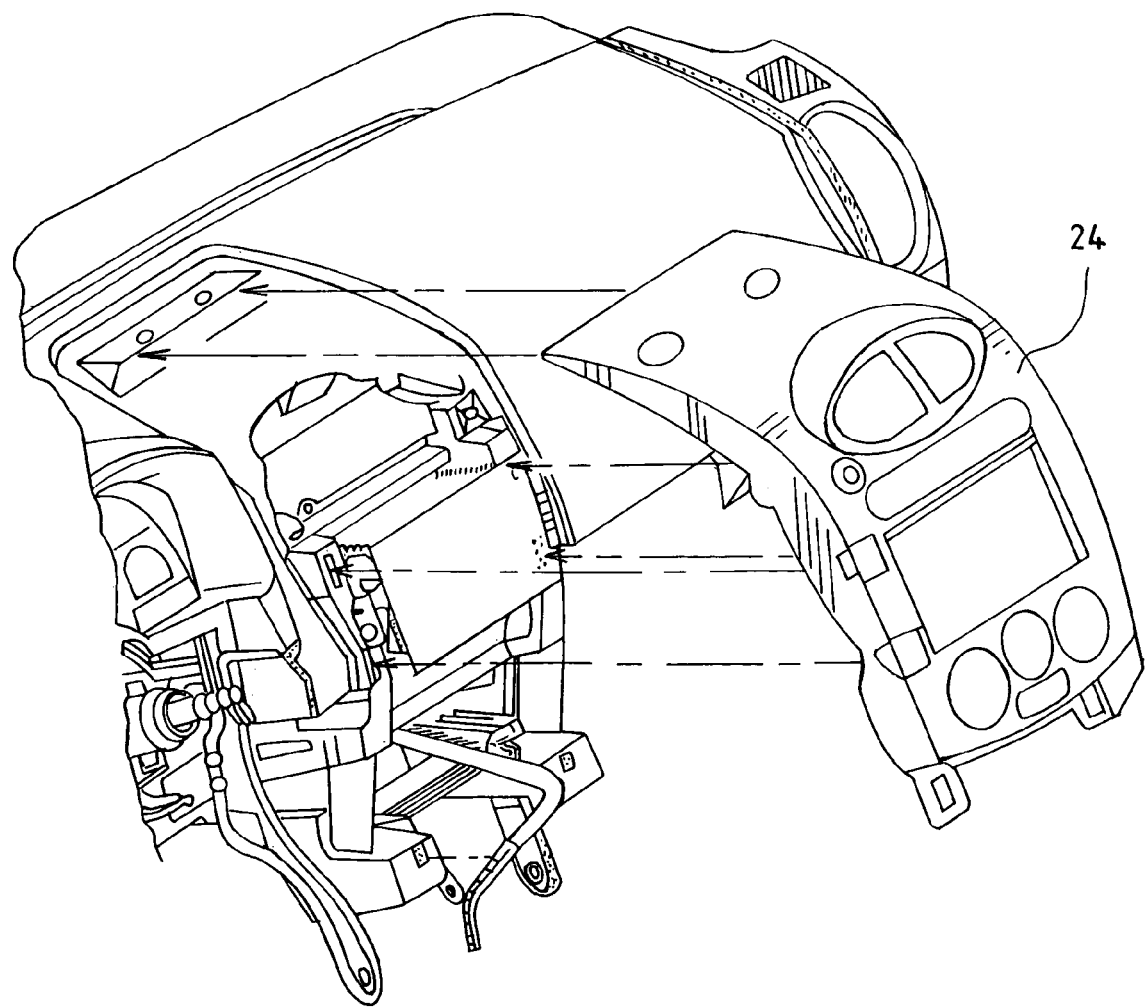
FIG. 10 is a view of prior art when the typical center stack face plate is removed exposing a standard HVAC system.
Figure 11:
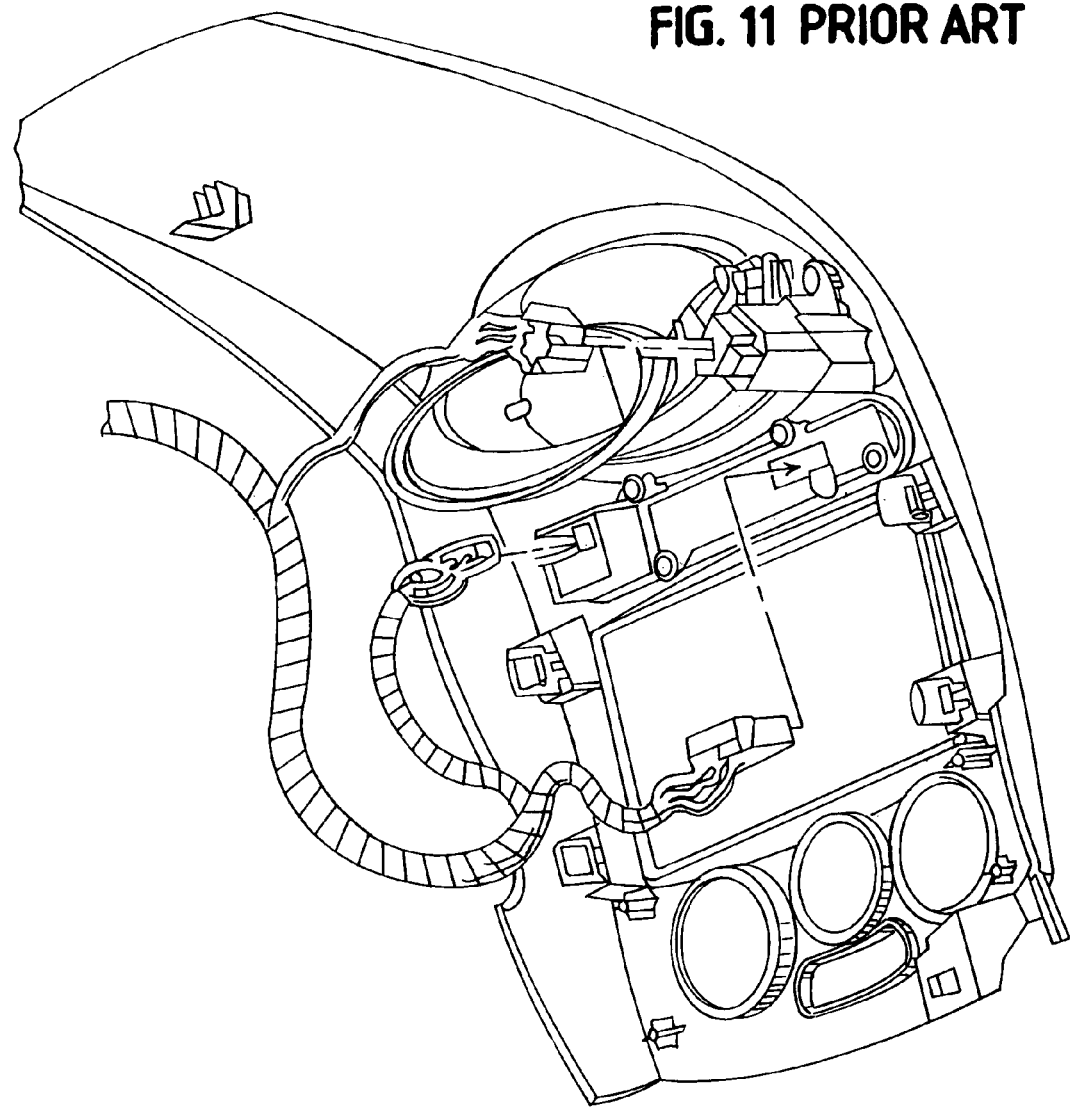
FIG. 11 is a view of prior art depicting the number of assemblies and parts that must be installed into a standard center stack face plate with a standard HVAC system.
Figure 12:
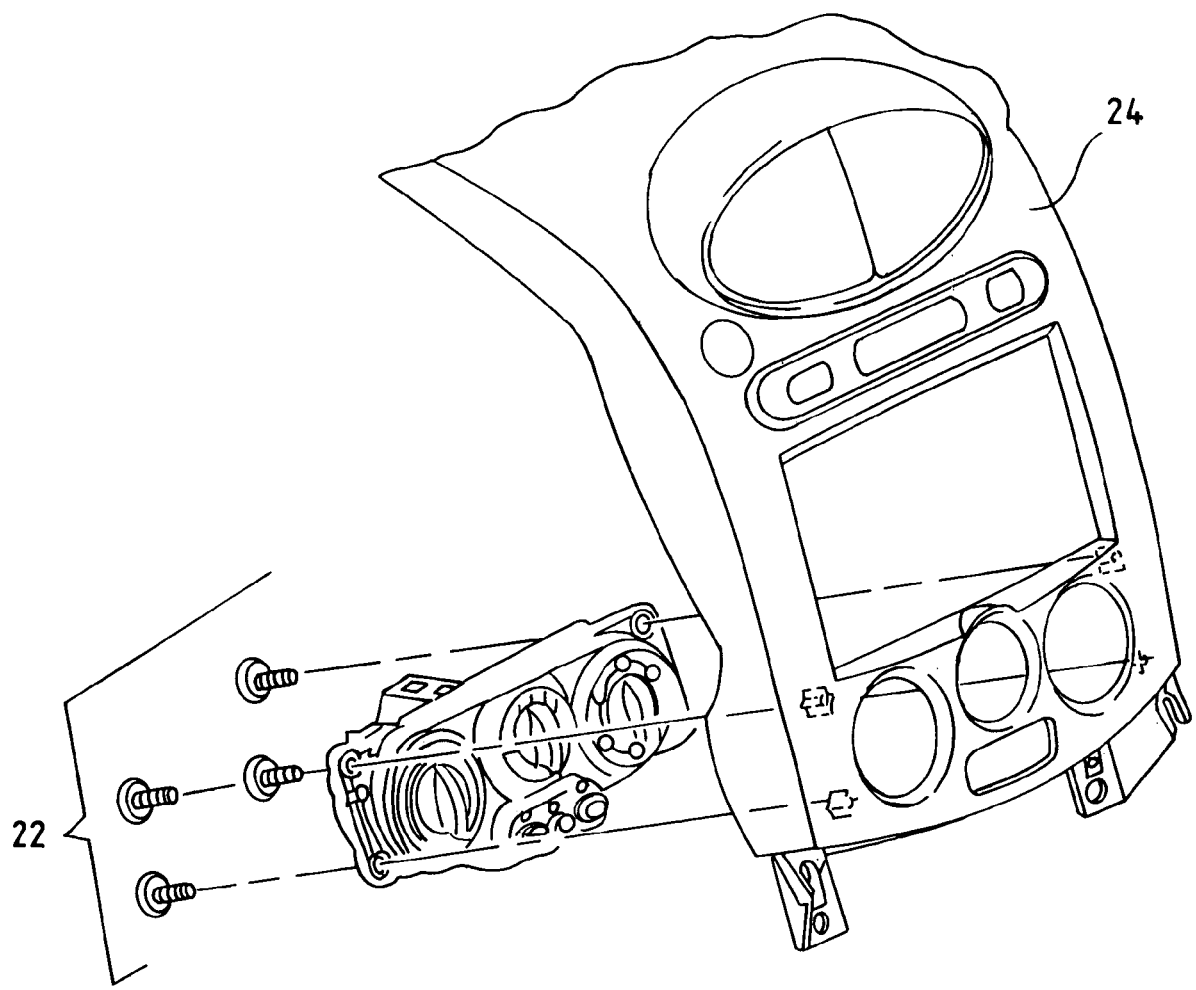
FIG. 12 is a view of prior art depicting the center stack face plate with the additional assemblies that must be added on the standard center stack face plate.

FIGS. 10–12 depict standard HVAC systems known in prior art. As seen in these figures, it is clear at first glance how many parts and assemblies this integrated center stack face plate 8 removes and how this invention streamlines an HVAC system. A standard center stack face plate 24 is not nearly as integrated as the center stack face plate 8 is in this invention. In standard HVAC systems, the standard center stack face plate 24 must attach to a significant number of plugs, seals, joints, assemblies, etc. FIGS. 11 and 12 clearly show assemblies that are no longer needed in this invention. All of the necessary parts are fully integrated instead.

In this invention, the typical boxes for the radio and HVAC system and its controls are taken apart and parts and assemblies are consolidated. This consolidation and design for a direct connection greatly streamlines the standard HVAC system. Not only is the standard HVAC system consolidated into the center stack face plate 8, but the radio and heating/air conditioning controls 20 are also fully integrated. There will be fewer instances or error at the point of manufacturing and less time spent on assembling parts or correcting assembly error. This results in lowered costs, which benefits both the manufacturer and consumer of this invention.

This invention functions in the same way as standard HVAC systems function. Hot or cold air is still expelled through the grills 18. However, this invention is greatly improved over the typical systems because it is so streamlined. It is not only easier to assemble at the point of manufacturing, but it is also easier to repair when the need arises. The reduced number of parts means that there are fewer parts not only to assemble but also fewer parts that can cause problems to the user.

What is claimed is:

1. A center stack face plate of a motor vehicle comprising:
    an HVAC system integrated with said center stack face plate, wherein said HVAC system includes a barrel assembly integrated with said center stack face plate and a connector duct and air conditioner housing integrated with said barrel assembly such that said HVAC system makes a direct connection with said center stack face plate and results in only one joint at the juncture of said center stack face plate and said barrel assembly.

2. The center stack face plate as set forth in claim 1, wherein said center stack face plate defines a back plate of said center stack face plate, said HVAC system making a direct connection with said back plate of said center stack face plate.

3. The center stack face plate as set forth in claim 1, wherein said center stack face plate further includes at least one controller integrated with said center stack face plate and adapted to control any combination of heating, ventilating, and air conditioning of said HVAC system.

4. The center stack face plate as set forth in claim 1, wherein said center stack face plate further includes at least one grill integrated with said center stack face plate and adapted to release any combination of heat, ventilation, and air conditioning of said HVAC system.

5. The center stack face plate as set forth in claim 1, wherein said center stack face plate further includes a radio integrated with said center stack face plate.

6. The center stack face plate as set forth in claim 5, wherein said center stack face plate further includes at least one controller integrated with said center stack face plate and adapted to control said radio.

7. The center stack face plate as set forth in claim 1, wherein said center stack face plate further includes a compact-disc changer integrated with said center stack face plate.

8. A center stack face plate of a motor vehicle comprising:
    an HVAC system integrated with said center stack face plate, wherein said HVAC system includes a barrel assembly integrated with said center stack face plate and a connector duct and air conditioner housing integrated with said barrel assembly such that said HVAC system makes a direct connection with said center stack face plate and results in only one joint at the juncture of said center stack face plate and said barrel assembly;
    at least one controller integrated with said center stack face plate and adapted to control any combination of heating, ventilating, and air conditioning of said HVAC system;
    at least one grill integrated with said center stack face plate and adapted to release any combination of heat, ventilation, and air conditioning of said HVAC system;
    a radio integrated with said center stack face plate;
    at least one controller integrated with said center stack face plate and adapted to control said radio; and
    a compact-disc changer integrated with said center stack face plate.

* * * * *